(12) United States Patent
Nicholson et al.

(10) Patent No.: US 8,510,564 B2
(45) Date of Patent: Aug. 13, 2013

(54) AUTOMATIC CONFIGURATION AND CONTINUATION OF FEDERATION RELATIONSHIPS

(75) Inventors: David J. Nicholson, Seattle, WA (US); David Lewis Fisher, Bellevue, WA (US); Michael D. Ritche, Seattle, WA (US); Chun-Hung Lin, Redmond, WA (US); Christopher B. Dove, Seattle, WA (US); Kavitha Radhakrishnan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 12/852,209

(22) Filed: Aug. 6, 2010

(65) Prior Publication Data

US 2012/0036566 A1    Feb. 9, 2012

(51) Int. Cl.
*H04L 9/32*    (2006.01)

(52) U.S. Cl.
USPC  713/176; 726/7; 714/E11.024; 714/E11.023; 714/48; 714/2

(58) Field of Classification Search
USPC ...... 713/176; 726/7; 714/E11.024, E11.023, 714/48, 2
See application file for complete search history.

(56) References Cited

U.S. PATENT DOCUMENTS

| | | | |
|---|---|---|---|
| 7,346,923 B2 | 3/2008 | Atkins et al. | |
| 7,487,539 B2 | 2/2009 | Ramachandran et al. | |
| 2004/0128400 A1* | 7/2004 | Srinivasan et al. | 709/250 |
| 2004/0225878 A1* | 11/2004 | Costa-Requena et al. | 713/150 |
| 2005/0071280 A1* | 3/2005 | Irwin et al. | 705/59 |
| 2005/0246726 A1* | 11/2005 | Labrou et al. | 719/328 |
| 2006/0021017 A1* | 1/2006 | Hinton et al. | 726/10 |
| 2006/0288228 A1 | 12/2006 | Botz et al. | |
| 2008/0263629 A1 | 10/2008 | Anderson | |

OTHER PUBLICATIONS

Goodner et al, Understanding WS-Federation, May 28, 2007, MSDN.*
Seguel et al, An Overview on Protocol Adaptors for Service Component Integration, Dec. 2008, Eindhoven University of Technology.*
Chris Clifton & Matt Bishop, Network Security Assurance, Oct. 30, 2003, University of Pittsburgh.*
Wikipedia, IPsec, Feb. 23, 2005.*
Wikipedia, Service-oriented architecture, Jan. 12, 2009.*
Shibboleth®, http://shibboleth.internet2.edu/, (2 pages).
"Federation of Identities in a Web Services World", Published Date: 2010; http://msdn.microsoft.com/en-us/library/ms951235(printer).aspx, (13 pages).

(Continued)

*Primary Examiner* — Brian P Whipple
(74) *Attorney, Agent, or Firm* — Workman Nydegger

(57) ABSTRACT

Embodiments are directed to establishing the integrity of a portion of data on at least one level of a plurality of network stack levels and automatically continuing an established federation relationship between at least two federation computer systems. In an embodiment, a first federation computer system receives a digital signature corresponding to a computer system signed by a digital signature which includes the computer system's identity and other federation relationship information configured to establish a trusted federation relationship between a first federation computer system and a second federation computer system. The first federation computer system attempts to validate the received digital signature at a first level of a network stack and determines that the validation at the first network stack layer was unsuccessful. The first federation computer system then validates the received digital signature at a second, different level of the network stack.

20 Claims, 4 Drawing Sheets

(56) References Cited

OTHER PUBLICATIONS

Uciel Fragoso-Rodriguez, Maryline Laurent-Maknavicius, Jose-Incera-Dieguez, "Federated Identity Architectures", Published Date: 2006, (8 pages).

Oasis, "SAML V2.0 Executive Overview", http://www.oasis-open.org/committees/documents.php?wg_abbrev=security, Published Date: Apr. 12, 2005, (7 pages).

Sun Microsystems, Federated Identity Management: The Foundation for Secure Large-Scale Outsourcing, White Paper, Published Date: Nov. 2006 (11 pages).

Gerry Gebel, Network Computing, "Federated Identity Management", http://www.scaleoutadvatage.techweb.com/news/nwc20070122_Federated.jhtml, Published Date: Jan. 22, 2007, (4 pages).

IBM, "Tivoli Federated Identity Manager", http://www-01.ibm.com/software/tivoli/products/federated-identity-mgr/ Retrieved Date : Jul. 1, 2010.

"Federation of Identities in a Web Services World," Accessed Jul. 5, 2010, htpp://msdn.microsoft.com-us/library/ms951235(printer).aspx, (13 pages).

Shibboleth®, http://shibboleth.internet2.edu/, Accessed Aug. 6, 2010, (2 pages).

\* cited by examiner

AUTOMATIC CONFIGURATION AND CONTINUATION OF FEDERATION RELATIONSHIPS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, the computer systems running the software applications may be linked together via a computer network. In some cases, the computer systems are not linked together until a trust relationship has been established between them. Such a trust relationship may be established using login credentials and/or digital signatures to establish a user's (or computer system's) identity. Using the trust relationship (or trusted connection), a user may access services provided by the other computer system. Over time, however, the trust relationship may be invalidated due to changes in the user's (or the computer system's) login credentials or digital signature.

BRIEF SUMMARY

Embodiments described herein are directed to establishing the integrity of a portion of data on at least one level of a plurality of network stack levels and automatically continuing an established federation relationship between at least two federation computer systems. In one embodiment, a first federation computer system receives metadata corresponding to a computer system signed by a digital signature, where the digital signature includes the computer system's identity and other federation relationship information configured to establish a trusted federation relationship between a first federation computer system and a second federation computer system. The first federation computer system attempts to validate the received digital signature at a first level of a network stack and determines that the validation at the first network stack layer was unsuccessful. The first federation computer system then validates the received digital signature at a second, different level of the network stack.

In another embodiment, a computer system determines that a federation relationship has been established between a first federation computer system and a second federation computer system using metadata signed with a digital signature trusted by both computer systems. The computer system determines that various changes to the metadata have occurred causing the trusted federation relationship to become invalid. The computer system determines which settings used to establish the trusted federation relationship are to be updated based on the changes to the metadata and updates those portions of the metadata determined to require a change. The computer system also automatically re-establishes the federation relationship between the first and second federation computer systems using the updated metadata.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
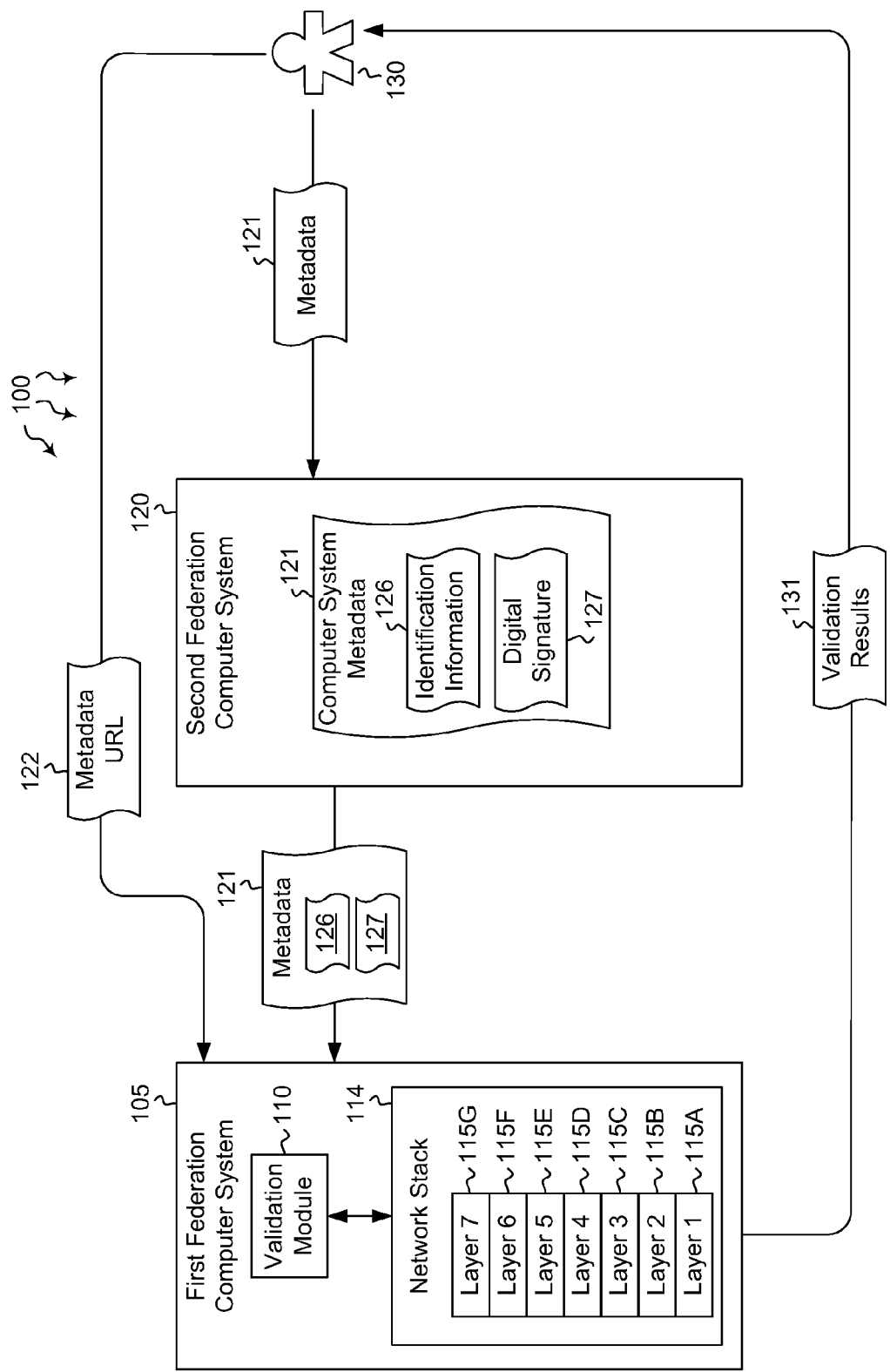
FIG. 1 illustrates a computer architecture in which embodiments of the present invention may operate including establishing the integrity of a portion of data on at least one level of a plurality of network stack levels.

Embodiments described herein are directed to establishing the integrity of a portion of data on at least one level of a plurality of network stack levels and automatically continuing an established federation relationship between at least two federation computer systems. In one embodiment, a first federation computer system receives a metadata corresponding to a computer system signed by a digital signature, where the digital signature includes the computer system's identity and other federation relationship information configured to establish a trusted federation relationship between a first federation computer system and a second federation computer system. The first federation computer system attempts to validate the received digital signature at a first level of a network stack and determines that the validation at the first network stack layer was unsuccessful. The first federation computer system then validates the received digital signature at a second, different level of the network stack.

In another embodiment, a computer system determines that a federation relationship has been established between a first federation computer system and a second federation computer system using metadata signed with a digital signature trusted by both computer systems. The computer system determines that various changes to the metadata have occurred causing the trusted federation relationship to become invalid. The computer system determines which settings used to establish the trusted federation relationship are to be updated based on the changes to the metadata and updates those portions of the metadata determined to require a change. The computer system also automatically re-establishes the federation relationship between the first and second federation computer systems using the updated metadata.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes Random Access Memory "RAM", Read-Only Memory "ROM", Electrically Eraseable Programmable Read-Only Memory "EEPROM", Compact Disc Read-only Memory "CD-ROM"or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a Network Interface Card "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network Personal Computers "PCs", minicomputers, mainframe computers, mobile telephones, Personal Digital Assistants "PDAs", pagers, routers, switches, and the like. The invention may also be practiced in distributed system environments where local and remote computer systems, which are linked (either by hardwired data links, wireless data links, or by a combination o hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes first federation computer system 105 and second federation computer system 120 (hereinafter "federation systems" or "federation servers"). The first and second federation servers may be configured to work with each other to provide services to various users. The second federation server may have a trusted federation relationship with one or more computer systems including first federation system 105. The trusted federation relationship may be established between the first and second federation servers using any of a plurality of different authentication mechanisms including digital signatures and digital certificates.

In some embodiments, second federation computer system 120 may be hosted by or associated with a school, business or other organization. This organization may desire to provide services to its users. These services may be provided in house by the organization or may be provided by other computer systems (e.g. first federation server 105). Accordingly, in such scenarios, the school or organization may apply their own branding, logos, user interfaces or other items to the service while the actual service functionality is provided by another federation server.

In some cases, user 130 may be a network administrator or other system user. The network administrator may desire to publish his or her metadata 121 to his or her computer system (e.g. second federation computer system 120), and provide a metadata uniform resource locator (URL) 122 to first federation computer system 105. The first federation computer system may then validate his or her metadata using validation module 110. This validation may be accomplished on different network stack layers, as will be explained in greater detail below. The results of the validation 131 may then be sent back to user 130.

In some embodiments, second federation server 120 may be configured to receive user 130's metadata 121 (including identification information 126 and/or digital signature 127) and store them in a data store. The identification information 126 and digital signature 127 may be bundled with other information (perhaps indicating which services are desired, or other policy considerations such as service access limits or user interface settings) in metadata 121. The metadata may be stored in any type of data structure including a structured data file such as an extensible markup language (XML) file. In such cases, the XML file comprising the identification information and digital signature, along with other information, is sent to the first federation server 105. This XML file may be parsed by the first federation server according to standard XML parsing standards. The digital signature may be verified as corresponding to the user and the user may be provided the service.

The verification of the digital signature may occur at any one of a plurality of different network stack layers. For instance, as shown in FIG. 1, network stack 114 may include seven layers (layer 1-layer 7 (115A-115G)). Each layer may correspond to a different part of a network connection. For example, in the well-known Open Systems Interconnection (OSI) model, various standards define what is to occur at each level. Thus, in embodiments implementing the OSI model, layer 1 (115A) corresponds to the physical layer, layer 2 (115B) to the data link layer, layer 3 (115C) to the network layer, layer 4 (115D) to the transport layer, layer 5 (115E) to the session layer, layer 6 (115F) to the presentation layer and layer 7 (115G) to the application layer. In some embodiments, digital signature validation may be configured to occur at the application layer (e.g. 115G), and, if validation fails at that level, may occur at a lower level such as the network or transport layer. This and other concepts will be explained in greater detail below with regard to method 200 of FIG. 2.

Figure 2:
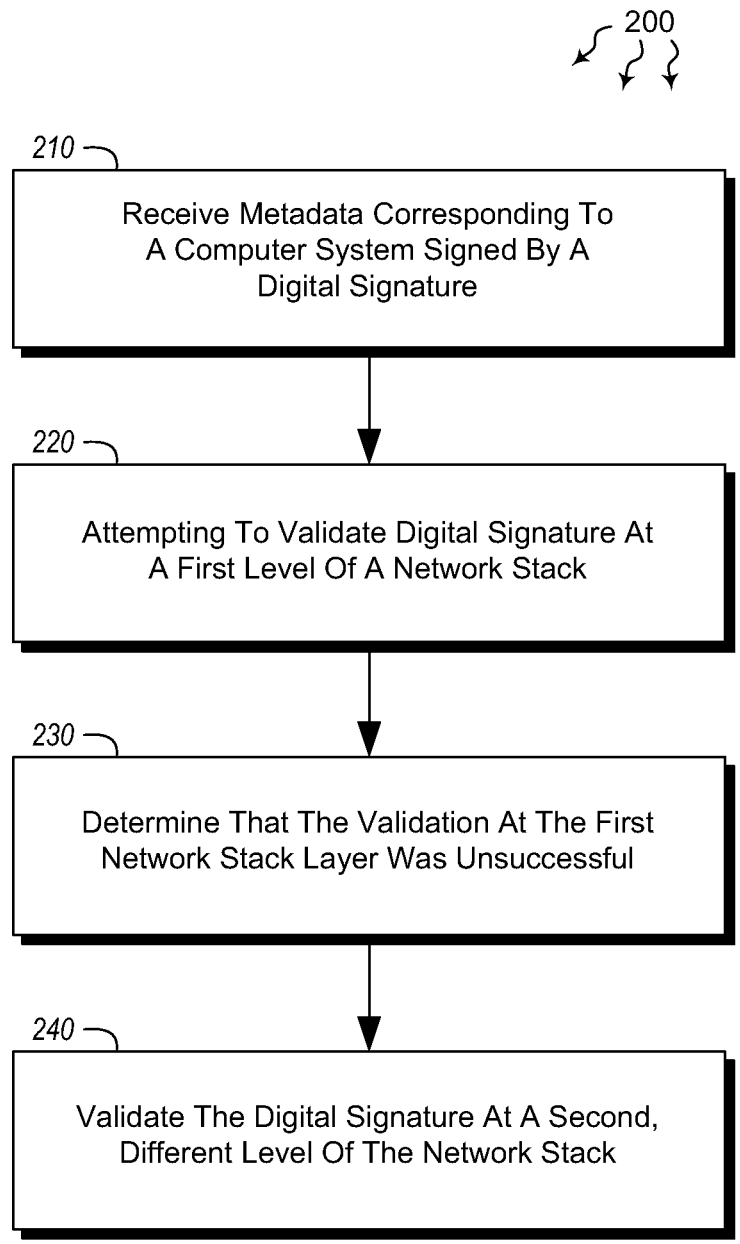
FIG. 2 illustrates a flowchart of an example method for establishing the integrity of a portion of data on at least one level of a plurality of network stack levels.
Figure 4:
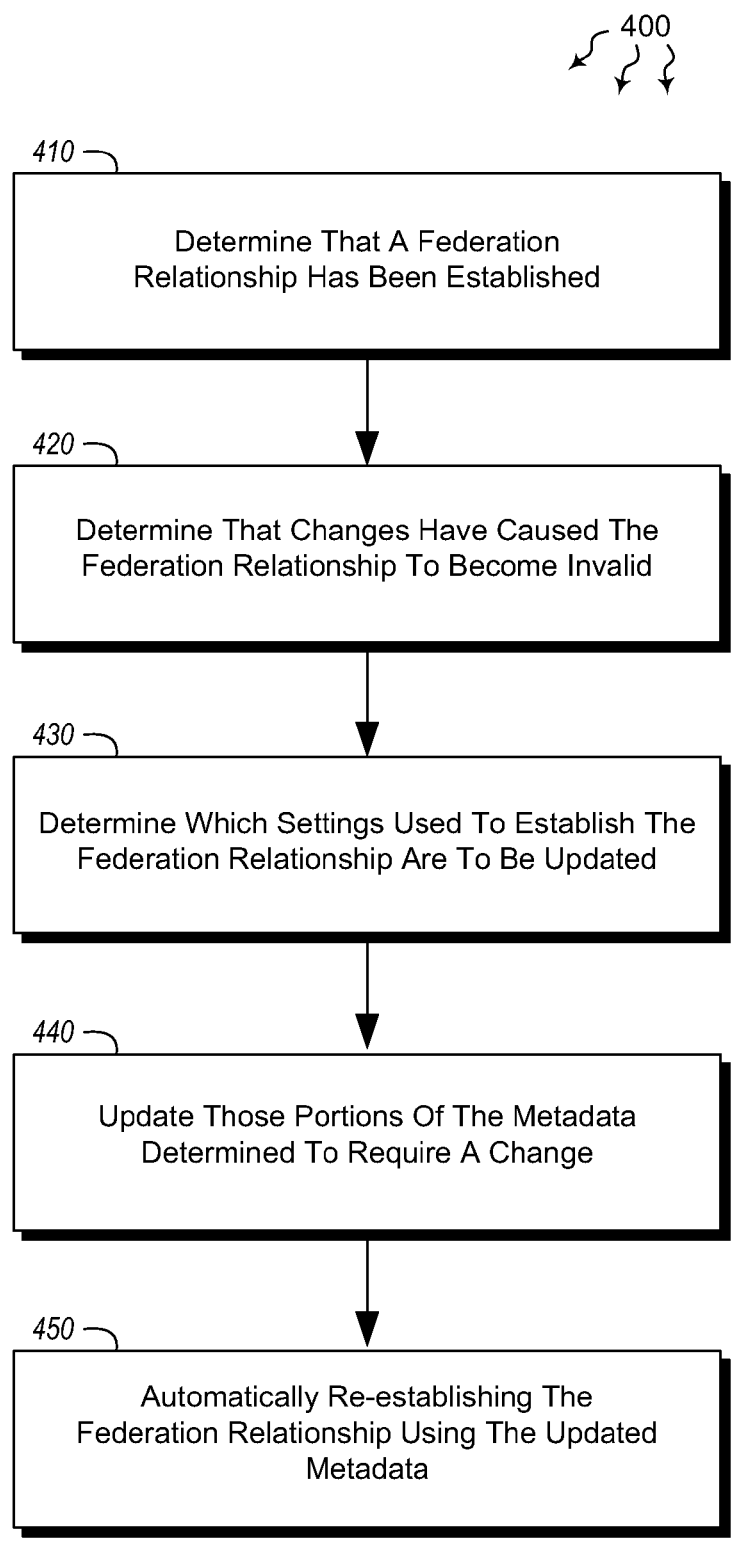
FIG. 4 illustrates a flowchart of an example method for automatically continuing an established federation relationship between at least two federation computer systems.

In view of the systems and architectures described above, methodologies that may be implemented in accordance with the disclosed subject matter will be better appreciated with reference to the flow charts of FIGS. 2 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for establishing the integrity of a portion of data on at least one level of a plurality of network stack levels. The method 200 will now be described with frequent reference to the components and data of environment 100.

Method 200 includes an act of a first federation computer system receiving metadata corresponding to a computer system signed by a digital signature, wherein the digital signature includes the computer system's identity and other federation relationship information configured to establish a trusted federation relationship between the first federation computer system and a second federation computer system (act 210). For example, first federation server 105 may receive metadata indicating how users are to be authenticated. For instance, server 105 may receive login URLs, certificates used to sign tokens or other information indicating how users are to be authenticated. The second federation computer system 120 may sign the computer system metadata 121 using a digital signature 127. The digital signature may also include other federation relationship information that is configured to establish a trusted federation relationship between first federation server 105 and second federation server 120 (if such a relationship does not already exist). The first federation server may interact with the second federation server using the trusted federation relationship.

In some cases, the federation relationship information may include at least a portion of metadata that is assessed by the first federation computer system to determine the first federation computer system's compatibility with the second federation computer system. For instance, some federation computer systems may not be compatible with other federation systems. Thus, metadata 121 may be assessed by first federation server 105 to determine whether it is compatible with federation system 120. The compatibility assessment may include a determination of whether the second federation system includes services and/or protocols that the first federation computer system supports. In such cases, if it is determined that the second federation system does include services and/or protocols that the first federation computer system supports, then the trusted federation relationship can be established.

Once established, the federation relationship's integrity may be re-validated at predetermined intervals or at the request of a user or other computer system. In some cases, first federation computer system 105 maintains a list of those federation servers with which it is compatible and with which it currently shares (or could share) a trusted federation relationship. In such cases, a user (e.g. an administrator) may be able to choose which federation server to connect to. The user interface providing such connection selections may include a filter to filter out incompatible federation servers. In this manner, the user is presented only with compatible federations servers. The filter may also be used to narrow down federation servers by other criteria including services provided, protocols used, authentication mechanisms used, etc.

In some cases, during initial configuration of a federation relationship, metadata may be exchanged which includes identification information 126 and digital signature 127. If the first federation server determines, upon accessing the metadata, that there are one or more errors in the metadata, the server may present the error to the user (e.g. a network administrator) for correction. When presenting the error(s), the server may also be configured to present to the user a way to solve the error(s). For instance, the first federation server may indicate that the user is to log in to the first federation server to solve the errors.

In FIG. 1, the user sends login credentials 125 to second federation server 120 for use in authenticating the user. In other cases, however, the user may have login credentials 125 stored in a (remote or local) data store which is accessible via a private link. In such cases, the first federation server may be configured to access the user's login credentials using the private link.

Returning to FIG. 2, method 200 includes an act of the first federation computer system attempting to validate the received digital signature at a first level of a network stack (act 220). For example, first federation server 105 may attempt to validate the received digital signature 127 at a given level of network stack 114. For instance, the first federation server may attempt to validate the digital signature at an application layer (e.g. layer 7). If the digital signature is validated at the application level, then the computer system is authenticated and any future updates to the metadata are to be signed by the signing entity described in the signature (e.g. a computer system, domain, or other entity). If the digital signature is not validated at the application level, it may be validated at a lower layer including (among others) the network layer (layer 3) or the transport layer (layer 4). Accordingly, in cases where the digital signature is validated at a lower network layer (e.g. via a secure protocol connection), any future updates to the digital signature are to be signed by the signing entity deduced from the underlying secure protocol connection. In both cases, the digital signature is stored (locally or remotely) for future connections so that when changes are made to the metadata, the federation server can ensure that the same (authenticated) entity has signed the metadata.

Method 200 includes an act of the first federation computer system determining that the validation at the first network stack layer was unsuccessful (act 230). For example, first federation server 105 may determine that the computer system's identification information 126 did not match the identification information signed by the digital signature 127. Thus, the first federation server's attempt to validate the metadata at the application layer (i.e. layer 7) may not succeed. The computer system's signed metadata may still be passed on, however, and authentication may take place at a lower network stack layer.

Hence, method 200 includes an act of the first federation computer system validating the received digital signature at a second, different level of the network stack (act 240). For example, first federation server 105 may validate the received digital signature 127 at a different, lower layer in the network stack 114. An entity may be validated by ensuring that the entity's identification information match the information used when setting up a secure protocol connection. In this manner, validation may fail at an application layer and succeed at a protocol layer. The results of the validation (e.g. 131) may be sent directly to the entity or to the second federation server which may then forward the results on to the entity. Thus, an entity or computer system may be authenticated at various different layers in a network stack, and may attempt validation at the different layers until one succeeds.

Turning now to FIG. 4, FIG. 4 illustrates a flowchart of a method 400 for automatically continuing an established federation relationship between at least two federation computer systems. The method 400 will now be described with frequent reference to the components and data of environment 300 of FIG. 3.

Figure 3:
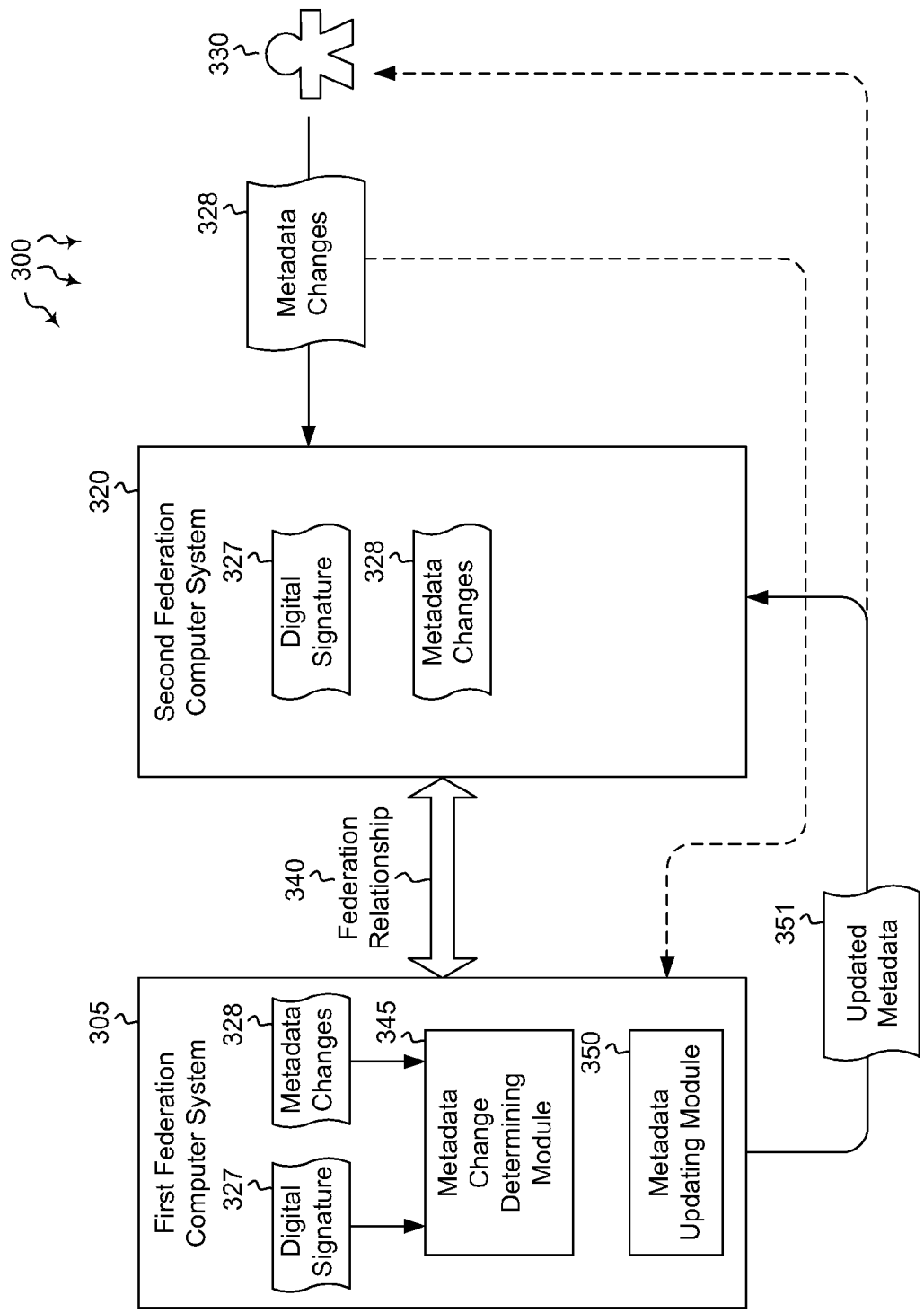
FIG. 3 illustrates a computer architecture in which embodiments of the present invention may operate including automatically continuing an established federation relationship between at least two federation computer systems

Method 400 includes an act of determining that a federation relationship has been established between a first federation computer system and a second federation computer system using metadata signed with a digital signature trusted by both computer systems (act 410). For example, federation relationship 340 may be established between first federation server 305 and second federation server 320. The federation relationship may be established using metadata signed with digital signature 327 that is trusted by both systems, or may use any other authentication or trust-establishment mechanism to establish the federation relationship. As will be appreciated by one skilled in the art, a federation relationship may be established between any number of computer systems, although only two are shown in FIG. 3. Moreover, as indicated above, a federation relationship may be re-validated at periodic intervals or at the request of a user or other federation computer system. The settings used to establish any given federation relationship may be stored in metadata.

Method 400 includes an act of determining that one or more changes to the metadata have occurred causing the trusted federation relationship to become invalid (act 420). For example, metadata change determining module 345 may determine that metadata changes 328 have caused federation relationship 340 to become invalid. For instance, user 330 may have changed their name or other portion of identification information. This change may cause a mismatch in metadata or other digital signature information which leads to the invalidation of the established trust relationship. Other causes of invalidation may include expiration of a digital signature after a predefined portion of time has passed or a certain date and time has arrived. Metadata change determining module 345 may be configured to determine various types of changes that may invalidate federation relationship. Upon determining that the federation relationship is invalid, the settings used to establish the trusted federation relationship may be updated.

Method 400 includes an act of determining which settings used to establish the trusted federation relationship are to be updated based on the changes to the metadata (act 430). For example, metadata updating module 350 may determine which settings used to establish trusted federation relationship 340 are to be updated, based on which changes to the metadata were detected. Thus, if the user's name was changed, the user name portion of the digital signature will need to be updated. If the digital signature expired, a new expiration date will need to be added. Many other changes and updates are possible—these examples should not be read as limiting all the different changes and corresponding updates that may be made. Moreover, the metadata changes 328 may be received from any of a variety of different sources including directly from the user 330 or from another federation server (e.g. server 320).

Method 400 includes an act of updating those portions of the metadata determined to require a change (act 440). For example, metadata updating module 350 may update those portions of the metadata determined by module 345 to require a change.

Method 400 also includes an act of automatically re-establishing the federation relationship between the first and second federation computer systems using the updated metadata (act 450). For example, first federation server 305 may automatically re-establish the federation relationship 340 between the first and second federation servers using the updated metadata 351. The updating and automatic re-establishment of the federation relationship may be performed in the background, without the user's knowledge and without any inputs from the user.

In some cases, the user may be notified that the federation relationship was automatically re-established using an updated digital signature or other updated metadata. In some cases, however, the automatic re-establishment may fail. In such cases, the user may be notified that re-establishing the federation relationship failed and may be prompted for input to resolve the federation relationship re-establishment failure. In this manner, the user is only aware that a re-establishment occurred when a problem occurs. Otherwise, the relationship is automatically re-validated using the updated metadata.

Accordingly, systems, methods and computer program products are provided that establish the integrity of a user or portion of data on at least one level of a plurality of network stack levels. Furthermore, systems, methods and computer program products are provided that automatically continue an established federation relationship between at least two federation computer systems. In this manner, trusted federation relationships can be established and continued with minimal disruption to the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for establishing the integrity of a portion of data on at least one level of a plurality of network stack levels, the method comprising:
    an act of a first federation computer system receiving metadata corresponding to a computer system, the metadata being signed by a digital signature, wherein the digital signature includes the computer system's identity and other federation relationship information configured to establish a trusted federation relationship between the first federation computer system and a second federation computer system;
    an act of the first federation computer system attempting to validate the received digital signature at a first level of a network stack;
    an act of the first federation computer system determining that the validation at the first network stack layer was unsuccessful; and
    based on determining that the validation at the first network stack layer was unsuccessful:
        an act of the first federation computer system extracting first identity information from the digital signature; and
        an act of the first federation computer system validating the received digital signature at a second, different level of the network stack, including validating that second identity information used to establish a secure protocol connection at the second level of the network stack matches the first identity information that was extracted from the digital signature.

2. The method of claim 1, wherein the first level of the network stack comprises an application layer and wherein the second level of the network stack comprises a protocol layer.

3. The method of claim 2, further comprising:
    storing the first identity information for subsequent federation connections, such that when future metadata changes are detected, the computer system is trusted and changes are automatically implemented.

4. The method of claim 3, wherein updates to the stored digital signature are signed by the entity that initiated the secure protocol connection.

5. The method of claim 1, wherein the first federation computer system interacts with the second federation computer system using the trusted federation relationship.

6. The method of claim 5, wherein the federation relationship information includes at least a portion of metadata that is assessed by the first federation computer system to determine the first federation computer system's compatibility with the second federation computer system.

7. The method of claim 6, wherein the compatibility assessment includes a determination of whether the second federation computer system includes services and protocols that the first federation computer system supports.

8. The method of claim 7, wherein the integrity of the federation relationship is re-validated at predetermined intervals.

9. The method of claim 7, wherein incompatible federations are filtered, such that a user is presented only with compatible federations.

10. The method of claim 6, wherein the metadata portion corresponding to a user is accessible via a private link.

11. The method of claim 10, wherein the first federation computer system accesses the metadata portion using the private link.

12. The method of claim 6, further comprising an act of determining that at least a portion of the metadata includes an error.

13. A computer program product for implementing a method for automatically continuing an established federation relationship between at least two federation computer systems, the computer program product comprising one or more recordable-type storage devices having stored thereon computer-executable instructions that, when executed by one or more processors of the computing system, cause the computing system to perform the method, the method comprising:
    an act of determining that a federation relationship has been established between a first federation computer system and a second federation computer system using metadata signed with a digital signature trusted by both computer systems;
    an act of determining that one or more changes to the metadata have occurred causing the trusted federation relationship to become invalid;
    an act of a determining which settings used to establish the trusted federation relationship are to be updated based on the changes to the metadata;
    an act of updating those portions of the metadata determined to require a change;
    an act of automatically re-establishing the federation relationship between the first and second federation computer systems using the updated metadata; and
    an act of validating the updated metadata, including:
        an act of attempting to validate a digital signature of the metadata at an application level of a network stack;
        an act of determining that the validation at the application layer was unsuccessful;
        an act of the extracting first identity information from the digital signature; and
        an act of validating the digital signature at the protocol level of the network stack, including validating that second identity information used to establish a secure protocol connection at the second level of the network stack matches the first identity information that was extracted from the digital signature.

14. The computer program product of claim 13, wherein the change causing the digital signature to become invalid comprises the expiration of the digital signature.

15. The computer program product of claim 13, wherein the change causing the digital signature to become invalid comprises a change in user information on the digital signature.

16. The computer program product of claim 13, further comprising an act of notifying a user that the federation relationship was automatically re-established using the updated digital signature.

17. The computer program product of claim 13, further comprising:
    an act of notifying a user that re-establishing the federation relationship failed; and
    an act of prompting the user for input to resolve the federation relationship re-establishment failure.

18. A computer system comprising the following:
    one or more processors;
    system memory;
    one or more computer-readable storage media having stored thereon computer-executable instructions that, when executed by the one or more processors, causes the computing system to perform a method for establishing the integrity of a portion of data on at least one level of a plurality of network stack levels, the method comprising the following:

an act of a provider federation computer system receiving a digital signature corresponding to a user, wherein the digital signature includes the user's identity and other federation relationship information configured to establish a trusted federation relationship between the provider federation computer system and a customer federation computer system;

an act of the provider federation computer system attempting to validate the received digital signature at the application level of a network stack;

an act of the provider federation computer system determining that the validation at the application layer was unsuccessful; and based on determining that the validation at the application layer was unsuccessful:

an act of the provider federation computer system extracting first identity information from the digital signature; and an act of the provider federation computer system validating the received digital signature at the protocol level of the network stack, including validating that second identity information used to establish a secure protocol connection at the second level of the network stack matches the first identity information that was extracted from the digital signature.

19. The method of claim 1, wherein the first identify information comprises computer system identity information.

20. The method of claim 1, wherein the first identify information comprises user identity information.

* * * * *